Nov. 11, 1924.    1,514,662
H. D. HUKILL
AUTOMOTIVE BRAKE
Filed Nov. 23  1923
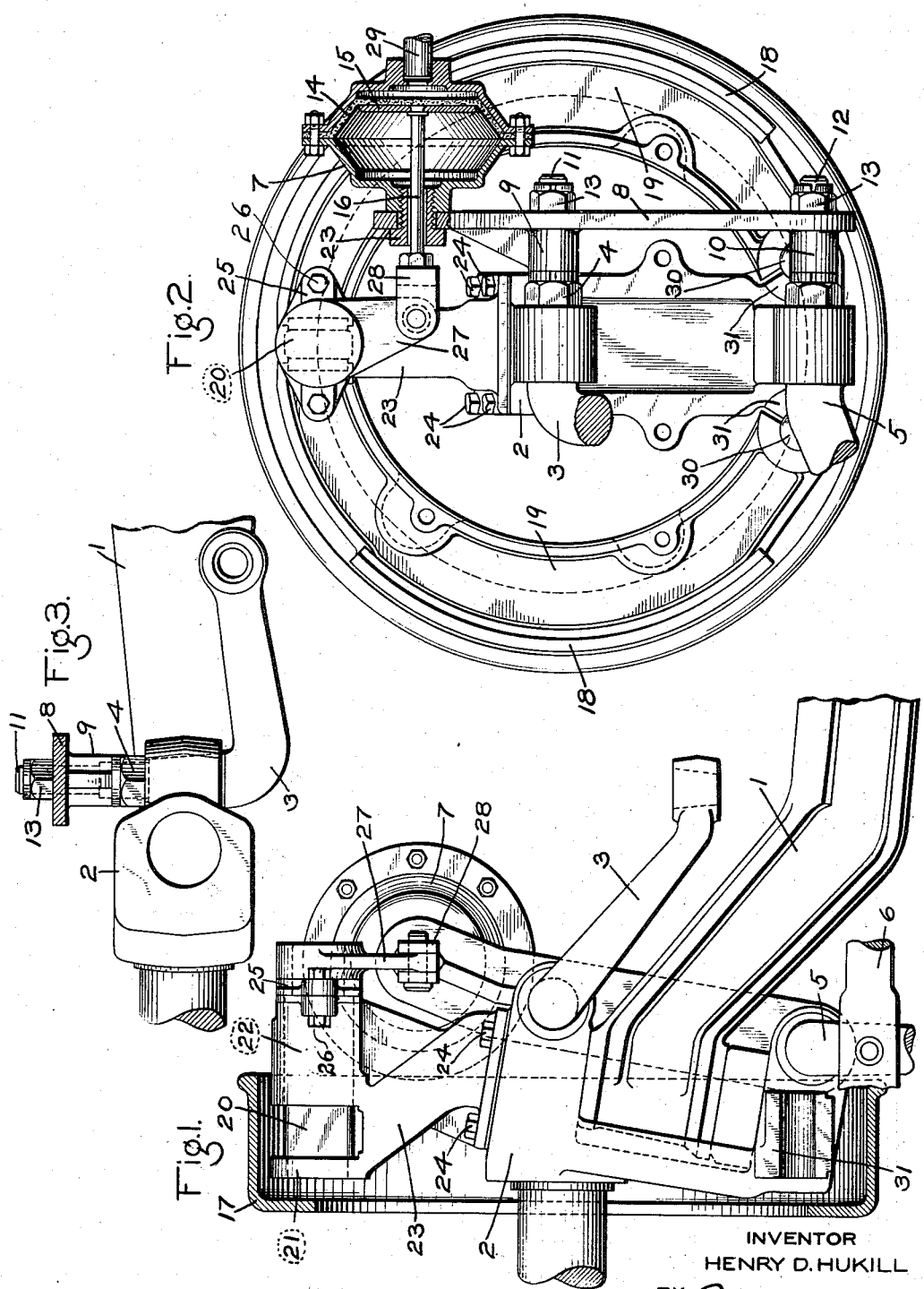
INVENTOR
HENRY D. HUKILL
BY  Wm. M. Cady
ATTORNEY Patented Nov. 11, 1924.

1,514,662

UNITED STATES PATENT OFFICE.

HENRY D. HUKILL, OF PITTSBURGH, PENNSYLVANIA, ASSIGNOR TO THE WESTING-HOUSE AIR BRAKE COMPANY, OF WILMERDING, PENNSYLVANIA, A CORPORATION OF PENNSYLVANIA.

AUTOMOTIVE BRAKE.

Application filed November 23, 1923. Serial No. 676,529.

*To all whom it may concern:*

Be it known that I, HENRY D. HUKILL, a citizen of the United States, residing at Pittsburgh, in the county of Allegheny and State of Pennsylvania, have invented new and useful Improvements in Automotive Brakes, of which the following is a specification.

This invention relates to brakes, and more particularly to a fluid pressure brake for the front wheels of a motor vehicle.

The principal object of my invention is to provide an improved pressure brake of the above character.

In the accompanying drawing; Fig. 1 is a side elevation of a front automotive brake construction, showing my improved brake mechanism applied thereto; Fig. 2 an inside face view of the construction shown in Fig. 1; and Fig. 3 a plan view thereof.

The front wheel construction to which my improved brake mechanism is shown applied in the drawing comprises a front axle 1 and a yoke shaped steering knuckle 2, preferably mounted on each of the opposite ends of the axle. A steering arm 3 is secured to the upper portion of the steering knuckle, being clamped in position by a nut 4. An arm 5 is secured to the lower portion of the steering knuckle and is pivotally connected to a tie rod 6, which is pivotally connected to a similar arm associated with the other front wheel construction.

According to my improvement, the diaphragm brake chamber 7 is secured to the steering knuckle 2 and for this purpose, a bracket 8 is provided. The bracket 8 is provided with bosses 9 and 10 which have bores to receive extended bolt sections 11 and 12 of the steering arm 3 and the arm 5, the bracket being clamped in position by means of nuts 13 applied to the respective bolt extensions 11 and 12.

The diaphragm brake chamber 7 may comprise flanged casing members, a flexible diaphragm 14 having its outer periphery clamped between the flanges of the casing members, a pressure plate 15 engaging one side of the diaphragm 14, and a diaphragm rod 16 carried by said pressure plate. The brake chamber 7 is secured to the upper end of the bracket 8 by means of a threaded bushing 23 and the rod 16 extends through said bushing. Secured to the front wheel is a brake drum 17 having an internal friction face adapted to be engaged by the brake shoes 18 carried by a pair of brake heads 19. Each brake head 19 is provided with a half bearing at one end and adapted to engage a pin 30, the other half bearing 31 for the pin 30 being carried by the knuckle 2. Interposed between the upper ends of the brake heads 19 is a cam 20 having bearing extensions 21 and 22 mounted in a bracket 23, said bracket being secured to the upper face of the steering knuckle 2 by bolts 24.

The outer end of the bearing extension is of reduced diameter and a cap plate 25 is applied over said reduced portion and is secured to the bracket 23 by bolts 26, so as to hold the cam member in place. A crank arm 27 is secured to the other end of the extension 22 and is preferably connected through a clevis 28 with rod 16.

Fluid under pressure is supplied to and released from one side of the flexible diaphragm 14 through a flexible pipe 29 and when fluid under pressure is supplied to the diaphragm, the rod 16 is projected toward the left so as to rock the arm 27 and thereby rotate the cam 20. The adjacent ends of the brake heads 19 are then spread apart, so that the brake shoes 18 are forced into frictional engagement with the friction face of the drum 17.

The diaphragm chamber 7 being rigidly secured to the knuckle 2 by means of the bracket 8 and the cam 20 and its connections being mounted in the bracket 23, which is also secured to the knuckle, it will be evident that the fluid pressure brake mechanism moves with the knuckle when the front wheels are turned in the act of steering, so that steering does not interfere with the operation of applying and releasing the brakes.

Having now described my invention, what I claim as new and desire to secure by Letters Patent, is:—

1. The combination with a front wheel steering knuckle, of a steering arm secured to said knuckle and having an extended portion, a tie rod arm secured to said knuckle and having an extended portion, a bracket secured to said extended portions, and a brake chamber secured to said bracket.

2. The combination with a front wheel steering knuckle, a steering arm secured to said knuckle, a tie rod arm secured to said knuckle, a bracket carried by said arms, and a brake chamber secured to said bracket.

3. The combination with a front wheel steering knuckle of a bracket carried by said knuckle, a brake chamber secured to said bracket, a brake operating rod associated with said brake chamber, another bracket secured to said knuckle, and a brake actuating member mounted in said second mentioned bracket and operatively connected to said brake operating rod.

4. The combination with a front wheel steering knuckle, of vertically disposed and laterally extending supports secured to said knuckle, a vertically disposed bracket secured to said supports, and a brake chamber secured to said bracket.

5. The combination with a front wheel steering knuckle, of a steering arm and a tie rod arm secured to said knuckle, a bracket secured to said arms, a brake chamber secured to said bracket and containing a flexible diaphragm, a rod operable by said diaphragm, a second bracket secured to said knuckle, a cam member mounted in said second mentioned bracket, brake members operated by said cam member for applying the brakes, and an arm operatively connecting said rod with said cam member.

In testimony whereof I have hereunto set my hand.

HENRY D. HUKILL.